US010697755B1

(12) United States Patent
Peters et al.

(10) Patent No.: US 10,697,755 B1
(45) Date of Patent: Jun. 30, 2020

(54) CALIBRATION OF ROTATING MIRROR SYSTEMS

(71) Applicant: BAE Systems Information and Electronic Systems Integration Inc., Nashua, NH (US)

(72) Inventors: Kevin W. Peters, Merrimack, NH (US); Chapin T. Johnson, Nashua, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 7 days.

(21) Appl. No.: 16/295,846

(22) Filed: Mar. 7, 2019

(51) Int. Cl.
   *G01B 11/00* (2006.01)
   *G01B 11/26* (2006.01)

(52) U.S. Cl.
   CPC ............ *G01B 11/002* (2013.01); *G01B 11/26* (2013.01)

(58) Field of Classification Search
   CPC ............................... G01B 11/002; G01B 11/26
   USPC ........................................................ 356/147
   See application file for complete search history.

(56) References Cited

U.S. PATENT DOCUMENTS

| 2014/0009604 | A1* | 1/2014 | Hinderling | G01C 15/002 348/142 |
| 2014/0313521 | A1* | 10/2014 | Bridges | G01C 15/002 356/614 |
| 2014/0375784 | A1* | 12/2014 | Massetti | A61B 1/0008 348/74 |
| 2015/0285903 | A1* | 10/2015 | Bridges | G01S 7/497 356/4.01 |
| 2015/0308818 | A1* | 10/2015 | Bridges | G01S 7/497 356/3.02 |

OTHER PUBLICATIONS

Khreishi, et al., "Optical testing using portable laser coordinate measuring instruments," conference proceedings, SPIE Optics + Photonics 2017, San Diego, CA (Aug. 6-10, 2017), published Aug. 6, 2017. 11 pages.
Khreishi, M., "Optical testing using portable laser coordinate measuring instruments," conference presentation, SPIE Optics + Photonics 2017, San Diego, CA (Aug. 6-10, 2017), published Aug. 6, 2017. 29 pages.

(Continued)

*Primary Examiner* — Isiaka O Akanbi
(74) *Attorney, Agent, or Firm* — Finch & Maloney PLLC

(57) ABSTRACT

Methodology for calibrating a rotating mirror system includes: measuring a normal of a first fiducial of the mirror system; measuring vectors to a second fiducial of the mirror system, each vector being measured at a different angle of rotation about an azimuth axis of rotation of the mirror system; calculating the azimuth axis of rotation using the measured vectors; creating a base coordinate system from the measured first fiducial normal and the calculated azimuth axis of rotation; and for each of a first mirror and a second mirror of the mirror system, measuring normals of the mirror at multiple angles of rotation, calculating an axis of rotation of the mirror using the measured normals, creating a mirror coordinate system from the measured normals and the calculated axis of rotation of the mirror, and calculating a translation and rotation matrix from the mirror coordinate system to the base coordinate system.

20 Claims, 10 Drawing Sheets

(56) References Cited

OTHER PUBLICATIONS

Eegholm, et al., "Lidar metrology for prescription characterization and alignment of large mirrors," Proc. SPIE 8131, Optical System Alignment, Tolerancing, and Verification, V, 813101 Sep. 12, 2011. 13 pages.

Burge, et al, "Use of a commercial laser tracker for optical alignment," Optical System Alignment and Tolerancing, edited by Jose M. Sasian, Mitchell C. Ruda. Proc. of SPIE vol. 6676, 66760E, 2007. 12 pages.

* cited by examiner

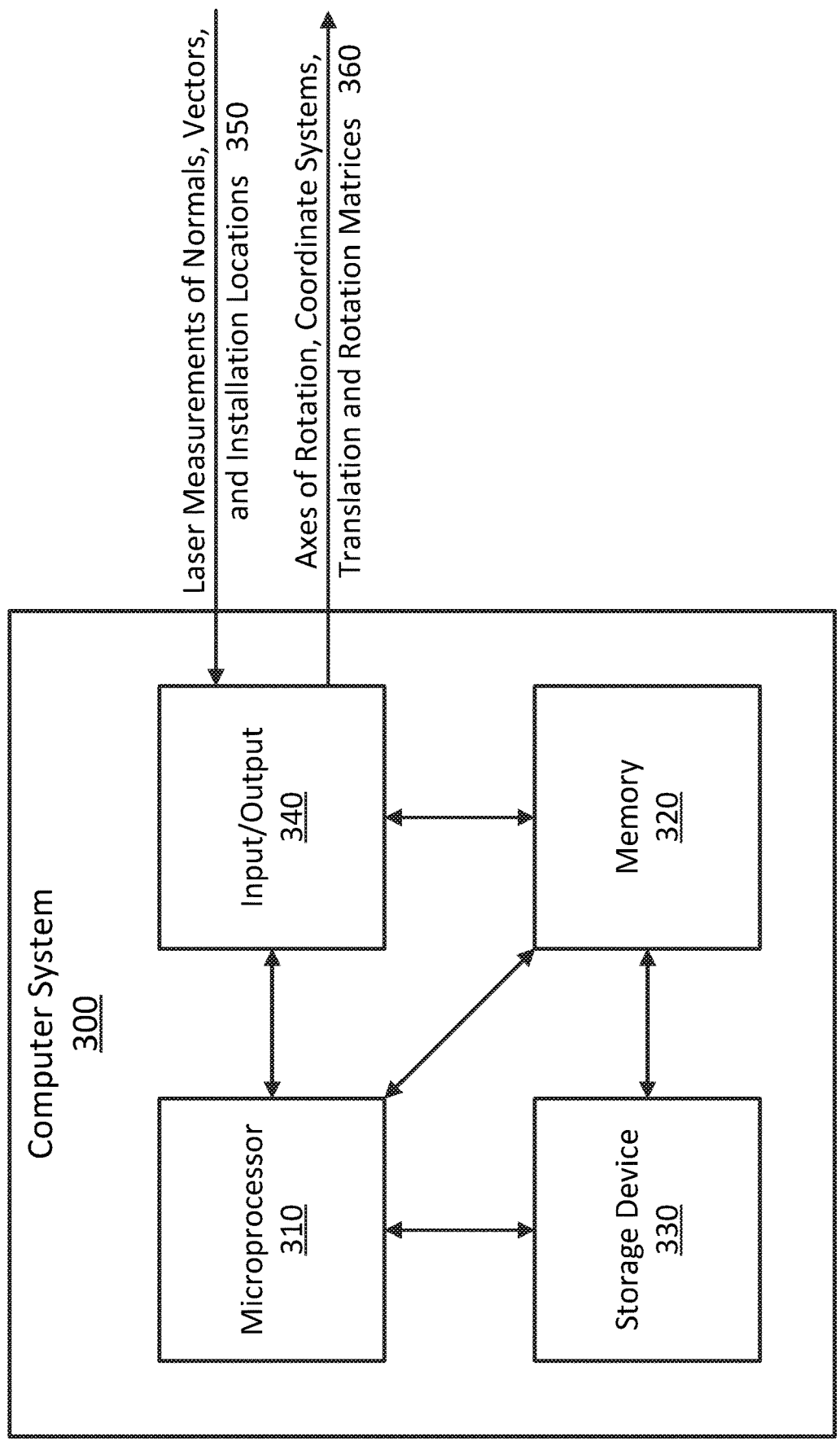

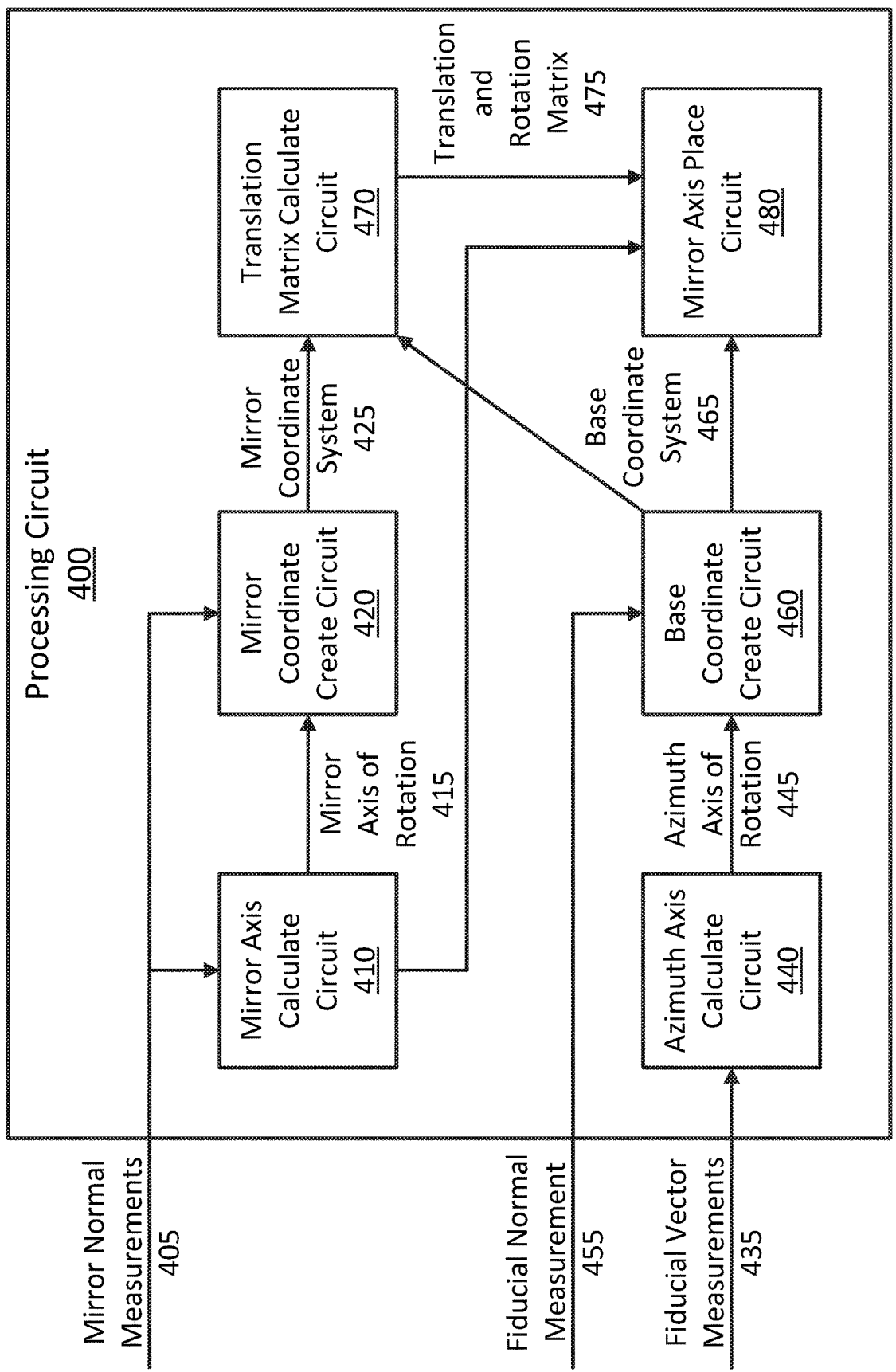

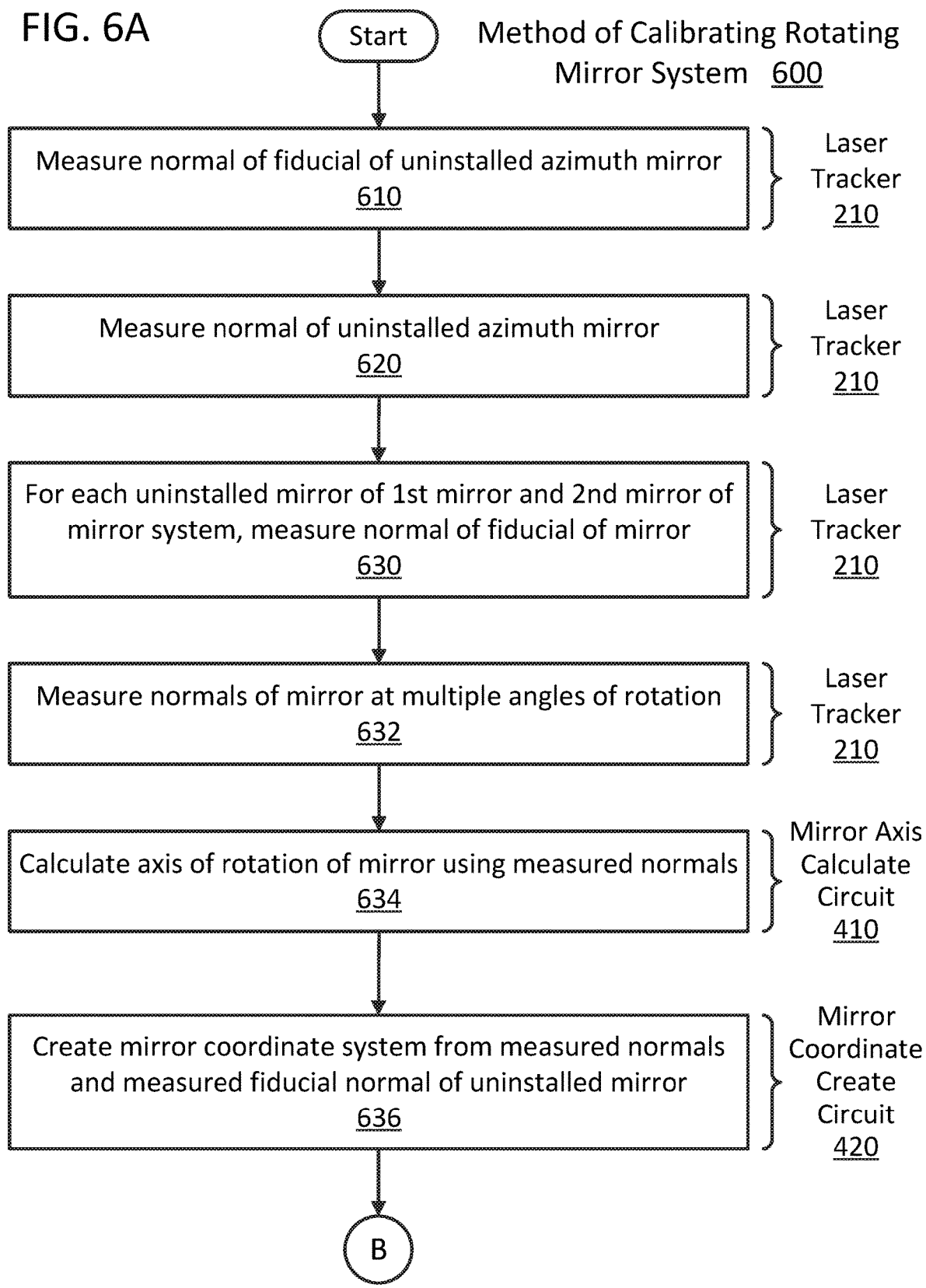

CALIBRATION OF ROTATING MIRROR SYSTEMS

BACKGROUND

Rotating mirrors are used in areas such as pointing systems for laser applications, like for communications, weapons, and the like. Pointing accuracy in such applications is important for the systems to work for their intended purpose. Calibration can be used to improve the accuracy of rotating mirror systems. However, there are a number of nontrivial issues associated with calibrating rotating mirror systems.

BRIEF DESCRIPTION OF THE DRAWINGS

FIG. 3 is a block diagram of an example computer system for calibrating a rotating mirror system, such as the rotating mirror system of FIG. 1, according to an embodiment of the present disclosure.

FIG. 4 is a block diagram of an example processing circuit for calibrating a rotating mirror system, such as the rotating mirror system of FIG. 1, according to an embodiment of the present disclosure.

FIGS. 6A-6C are flow diagrams of an example method of calibrating a rotating mirror system, such as with the processing circuit of FIG. 4, according to another embodiment of the present disclosure.

Figure 1:
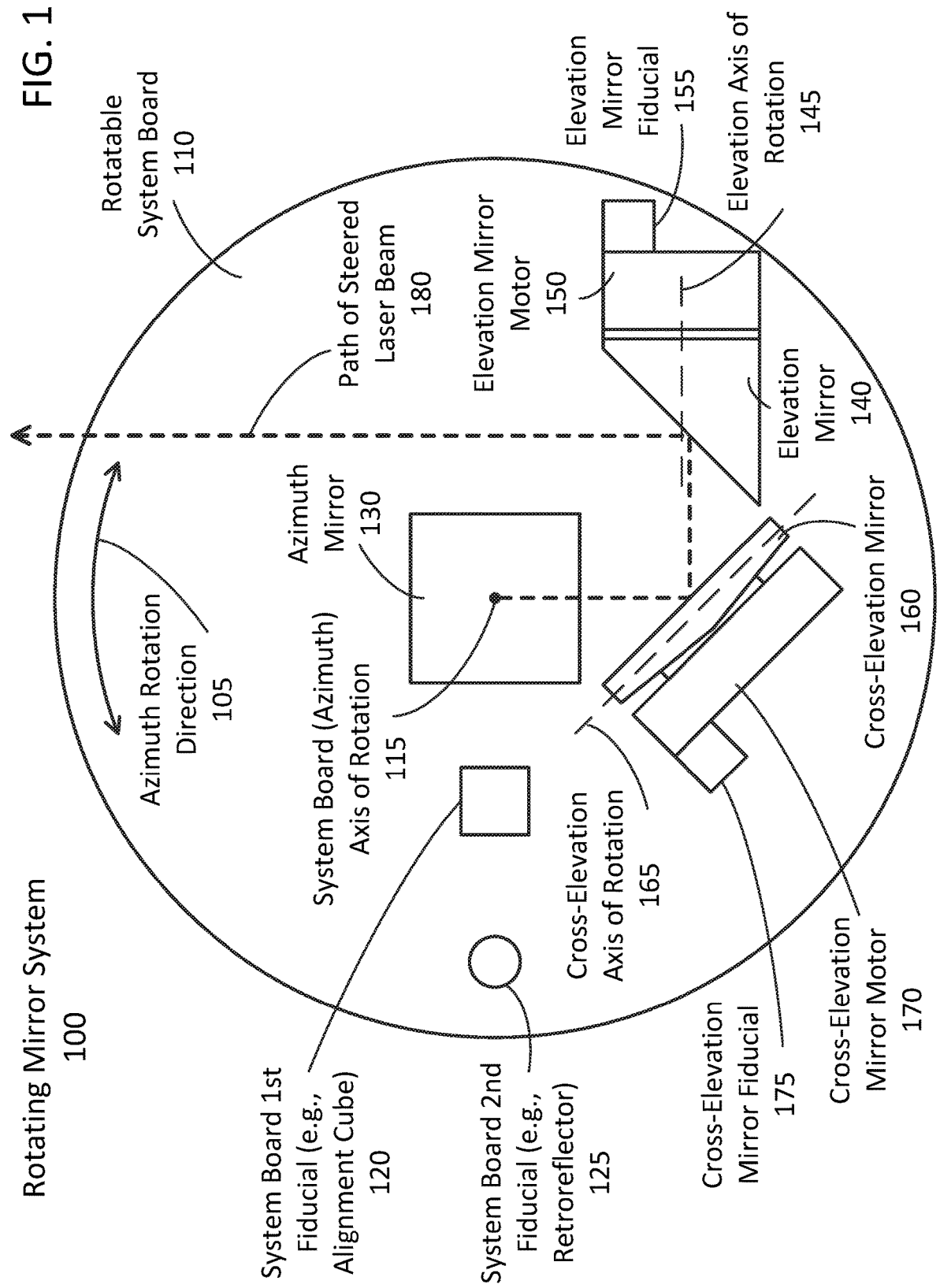
FIG. 1 is a plan view of an example rotating mirror system for calibrating with a calibration technique, according to an embodiment of the present disclosure.

Although the following Detailed Description will proceed with reference being made to illustrative embodiments, many alternatives, modifications, and variations thereof will be apparent in light of the present disclosure.

DETAILED DESCRIPTION

According to one embodiment of the present disclosure, a method of calibrating a rotating mirror system is provided. The mirror system includes two or more rotating (or rotatable) mirrors on or attached to a system board. Each rotating mirror rotates (or is capable of rotation) about a corresponding axis of rotation. The system board itself (including the mirrors) rotates about an azimuth axis of rotation. The method includes precisely measuring, such as with a laser tracker, a normal of a first fiducial (or reference surface) of the mirror system. The first fiducial can be, for example, an alignment cube on the system board and having mirrored sides for performing precise angular measurements. The method further includes precisely measuring (such as with the laser tracker) vectors to a second fiducial (or reference point) of the mirror system at several angles of rotation about the azimuth axis of rotation of the mirror system. The second fiducial can be, for example, a retroreflector, such as a spherically mounted retroreflector (SMR), for measuring very precise distances with a laser tracker. The method further includes calculating, such as with a processing circuit like a microprocessor, the azimuth axis of rotation using the measured vectors. In one such embodiment, a least squares fit to the measured vectors is used to calculate the azimuth axis of rotation. The method also includes creating, such as with the processing circuit, a base coordinate system from the measured first fiducial normal and the calculated azimuth axis of rotation. In one such embodiment, the first fiducial normal is also normal to the azimuth axis of rotation.

In some such embodiments of the calibration method, the two or more rotating mirrors include an elevation mirror and a cross-elevation mirror, each fixed to the system board. Each of these mirrors has a corresponding axis of rotation that is normal to the azimuth axis of rotation of the system board or mirror system. Together, the board, the two mirrors, and the corresponding three axes of rotation are sufficient to direct a laser beam off the elevation mirror in any direction with an accuracy of one arcsecond or smaller. To this end, for each of the rotating mirrors, the method further includes precisely measuring, such as with the laser tracker, normals of the rotating mirror at multiple angles of rotation. From this, the method further includes calculating, with the processing circuit, an axis of rotation of the rotating mirror using the measured normals. In some embodiments, a least squares fit to the measured normals is used to calculate this axis of rotation. The method also includes creating, with the processing circuit, a rotating mirror coordinate system from the measured normals and a reference line not parallel to the measured normals, such as the calculated axis of rotation of the rotating mirror. In some such embodiments, the method further includes calculating, with the processing circuit, a translation and rotation matrix from this rotating mirror coordinate system to the base coordinate system. In one such embodiment, the method includes placing, with the processing circuit, the calculated axis of rotation into the base coordinate system using the calculated translation and rotation matrix. The method further includes repeating these operations for the other rotating mirror to complete the calibration. By placing all three axes of rotation into a common coordinate system, a laser beam is capable of being directed in any direction (by using the board, the mirrors, and the axes of rotation) to an accuracy of one arcsecond or smaller. Numerous variations and embodiments will be appreciated in light of this disclosure.

General Overview

As mentioned above, there are a number of nontrivial issues associated with calibrating rotating mirror systems. Accuracy goals for such systems can be quite demanding, such as one arcsecond or even less. Achieving such goals can be extremely challenging given the several degrees of freedom that need to be concurrently managed. For example, theodolite-based methods of calibration are impractical at this level of accuracy. Moreover, these theodolite methods are relatively complex and time consuming. Additionally, the theodolite methods would require the use of at least three theodolite instruments simultaneously. Furthermore, these theodolite methods would require significant and complex post processing.

Thus, in accordance with one or more embodiments of the present disclosure, techniques are provided for calibrating the position of moving and rotating mirror based pointing systems for laser applications. This calibration achieves highly accurate pointing that some laser systems require. In some applications, the calibrated pointing accuracy is less than one arcsecond (e.g., less than five microradians). In some embodiments, the techniques represent an improvement over theodolite solutions, in that they can be completed using far more automation than theodolite solutions, using much less technician time or skill (such as only a few hours, instead of days), and the processing is significantly less complex. According to some embodiments, these calibration techniques significantly reduce the calibration and processing time for beam director calibrations while also providing greater accuracy.

As will be further appreciated, the techniques allow for automation or semi-automation of an otherwise complex calibration process. One such embodiment, for instance, provides a non-transitory computer program product that when executed by one or more processors, causes a process to be carried out for calibrating a rotating mirror system. The process includes: receiving a measurement of a normal of a first fiducial of the mirror system; receiving measurements of vectors to a second fiducial of the mirror system, each vector being measured at a different angle of rotation about an azimuth axis of rotation of the mirror system; calculating the azimuth axis of rotation using the measured vectors; and creating a base coordinate system from the measured first fiducial normal and the calculated azimuth axis of rotation. Then, for each of a first mirror and a second mirror of the mirror system, the process continues with receiving measurements of normals of the mirror at multiple angles of rotation, calculating an axis of rotation of the mirror using the measured normals, and creating a mirror coordinate system from the measured normals and a reference line not parallel to the measured normals. The degree to which these functions are automated can vary from one embodiment of the next, as will be further appreciated in light of this disclosure.

In some embodiments, a commercial laser tracker system (such as a laser tracker and associated SMRs) is used to precisely measure the mirror normal of the moving mirror at multiple pointing positions for each individual mirror in the system. A least squares fit is then applied to the measured data to calculate the rotation axis of the mirror. In some such embodiments, completed calibration using these techniques have achieved measurements of the mirror normal vectors of the mirrors within an arcsecond or two. In addition, the least squares fit has been able to determine the rotation axis within less than an arcsecond. In some embodiments, all the mirrors in the rotating mirror system are put into a single coordinate system, such as by using an alignment cube on the beam director assembly (or system board, which includes the assembly with the moving mirrors). In some embodiments, two faces of this cube are measured as the reference using the laser tracker, and these measured values are the single coordinate system. In some other embodiments, one face of the alignment cube is used for reference in conjunction with a calculated azimuth axis of rotation used for another reference. In some such embodiments, the azimuth axis of rotation is calculated by applying a least squares fit to measured vectors to an SMR attached to the system board at several different angles of azimuth.

In an example embodiment of the present disclosure, a calibration technique for a rotating mirror system is provided. The mirror system includes a system board that rotates on an azimuth axis of rotation. The mirror system further includes two rotating mirrors, namely an elevation mirror and a cross-elevation mirror. The elevation mirror and rotating system board provide 360° coverage about their respective axes of rotation to steer a corresponding laser beam directed at the elevation mirror in most directions by a combination of the two degrees of freedom. The cross-elevation mirror, by contrast, has much more limited coverage, but allows for fine adjustment of the elevation mirror while also allowing all directions to be reached (especially extreme vertical directions).

The technique includes precisely measuring various vectors and calculating the three axes of rotation from the measured vectors. In further detail, the azimuth axis of rotation is obtained by calculating a least squares fit to numerous vector measurements of an SMR on the system board at numerous angles of azimuth (e.g., at least three such angles, such as 6, 9, 18, or 36, to define a plane of rotation to which the azimuth axis of rotation is perpendicular). In addition, each of the elevation and cross-elevation axes of rotation is calculated from a least squares fit to numerous mirror normal vectors (e.g., 5, 10, 20, or 40) measured at different angles of rotation of the elevation and cross-elevation mirrors, respectively. In one embodiment, the measured elevation mirror normal vectors are further used to determine the wobble of the elevation mirror using a fitting mirror. In other embodiments, further rotating mirrors are part of the system board, and calibrated in similar fashion to the elevation and cross-elevation mirrors.

The technique also includes measuring a normal to a face of an alignment cube on the system board, which together with the calculated azimuth axis of rotation (to which the alignment cube normal is perpendicular), provide a set of reference directions for establishing a single coordinate system. A third such reference direction can be obtained as the cross product of the first two reference directions. In another embodiment, normals to two faces of the alignment cube are used for the first two reference directions (instead of using the calculated azimuth axis of rotation).

Numerous other example embodiments and configurations will be apparent in light of this disclosure.

System Architecture

FIG. 1 is a plan (top down) view of an example rotating mirror system 100 for calibrating with a calibration technique, according to an embodiment of the present disclosure. In FIG. 1, there is a rotatable system board 110 (or board directory assembly) for mounting or otherwise affixing numerous mirrors and fiducials to complete the rotating mirror system 100. The system board 110 rotates 360° in an azimuth direction 105 (e.g., clockwise or counterclockwise in the plan view of FIG. 1) about an azimuth axis of rotation 115 using a motor, a calibration tool (such as an optical encoder), and a controller to control the motor using the optical encoder to rotate the system board 110 to a desired angle of azimuth. The mirror system 100 also includes various fiducials on the system board 110 for precision measuring with a laser tracker, including a first fiducial 120 (e.g., an alignment cube) and a second fiducial 125 (e.g., a retroreflector, such as an SMR). In the mirror system 100, laser light is emitted from beneath the system board 110 through an aperture centered about the axis of rotation 115. To this end, a fixed azimuth mirror 130 (such as a right angle mirror) directs the emitted laser light to other parts of the system board 110 in a direction parallel to a top surface of the system board 110.

The mirror system 100 further includes an elevation mirror 140 having a rotatable right-angle mirror surface (e.g., a 45° sliced cylindrical shape) controlled by an elevation mirror motor 150. The elevation mirror surface rotates 360° about an elevation axis of rotation 145 (parallel to the system board 110) for changing the corresponding elevation of the emitted beam to anywhere between 0° and 360°. To this end, the elevation mirror 140 can include a calibration tool such as an optical encoder to precisely track the angle of rotation and a controller to control the elevation mirror motor 150 using the optical encoder to rotate the elevation mirror 140 to a desired angle of rotation. An elevation mirror fiducial 155 (e.g., an alignment cube attached to the elevation mirror assembly) provides a frame of reference for the elevation mirror 140, such as for calibrating the elevation mirror 140 in an isolated environment (e.g., not yet installed on the system board 110) and then installing the elevation mirror 140 (and associated assembly) on the system board 110 without having to recalibrate the elevation mirror 140. Since the elevation mirror surface does not coincide with azimuth axis of rotation 115, not all directions of a steered laser beam 180 are possible using just the azimuth axis of rotation 115 and the elevation axis of rotation 145.

Accordingly, a cross-elevation mirror 160 is also included on the system board 110 and having a rotatable plane mirror surface controlled by a cross-elevation mirror motor 170. The cross-elevation mirror surface rotates a relatively small portion (such as 10°) about a cross-elevation axis of rotation 165 (parallel to the system board 110) for changing the corresponding elevation of the emitted beam (e.g., between plus or minus 10° of parallel to the system board 110). The cross-elevation mirror 160 can also include a calibration tool (such as an optical encoder) to precisely track the angle of rotation and a controller to control the cross-elevation mirror motor 170 using the optical encoder to rotate the cross-elevation mirror 160 to a desired angle of rotation. The cross-elevation mirror 160 provides a way to fine tune the elevation mirror 140 and achieve steered laser beam directions (e.g., vertical and near vertical directions) with the mirror system 100 not possible using only the azimuth rotation and the elevation mirror rotation. A cross-elevation mirror fiducial 175 (e.g., an alignment cube attached to the cross-elevation mirror assembly) provides a frame of reference for the cross-elevation mirror 160, such as for calibrating the cross-elevation mirror 160 in an isolated environment (e.g., not yet installed on the system board 110) and then installing the cross-elevation mirror 160 (and associated assembly) on the system board 110.

Figure 2A:
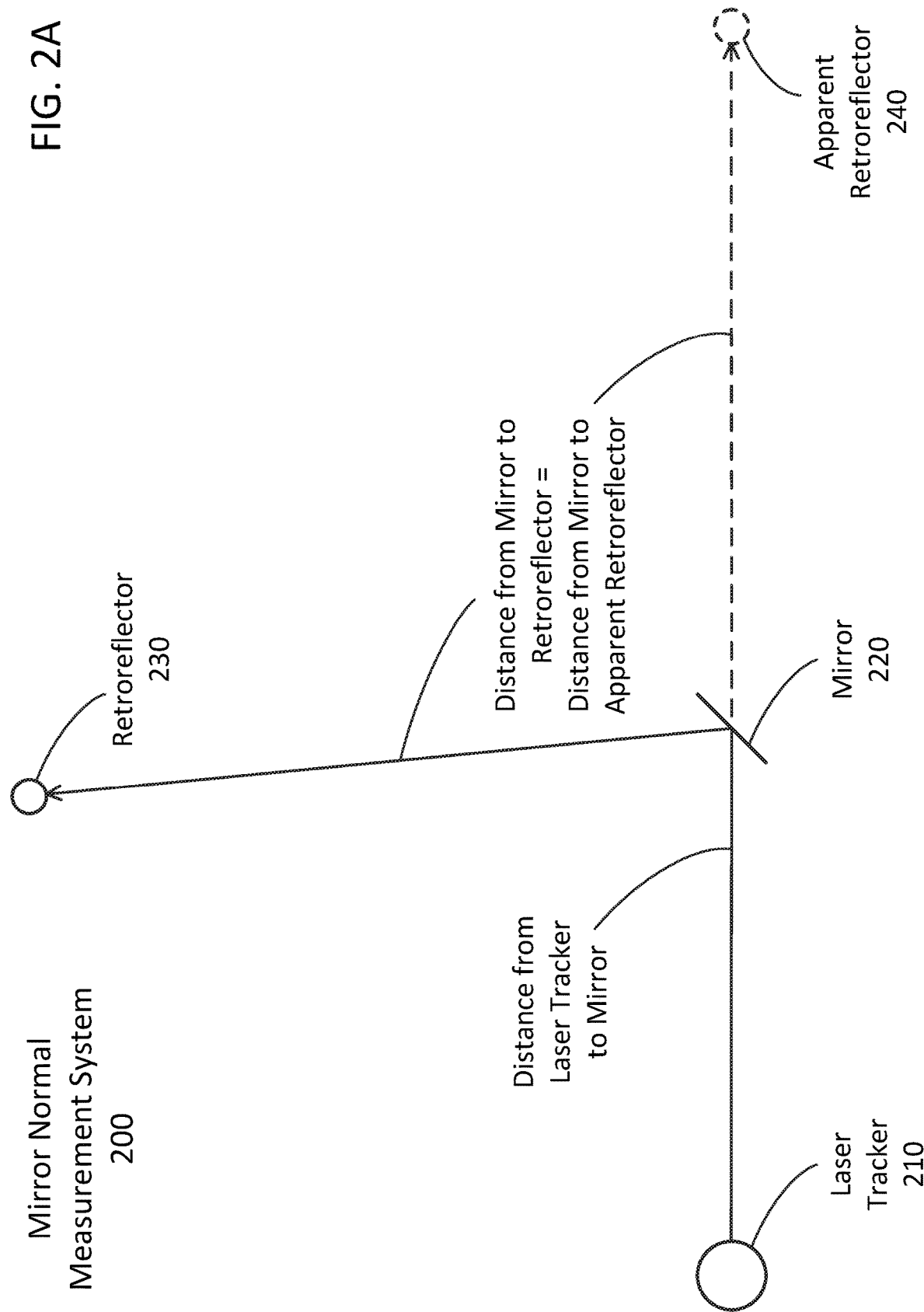
FIGS. 2A-2B are schematic diagrams of an example measurement system for measuring a mirror normal, such as for calibrating a rotating mirror system like the rotating mirror system of FIG. 1, according to an embodiment of the present disclosure.
Figure 2B:
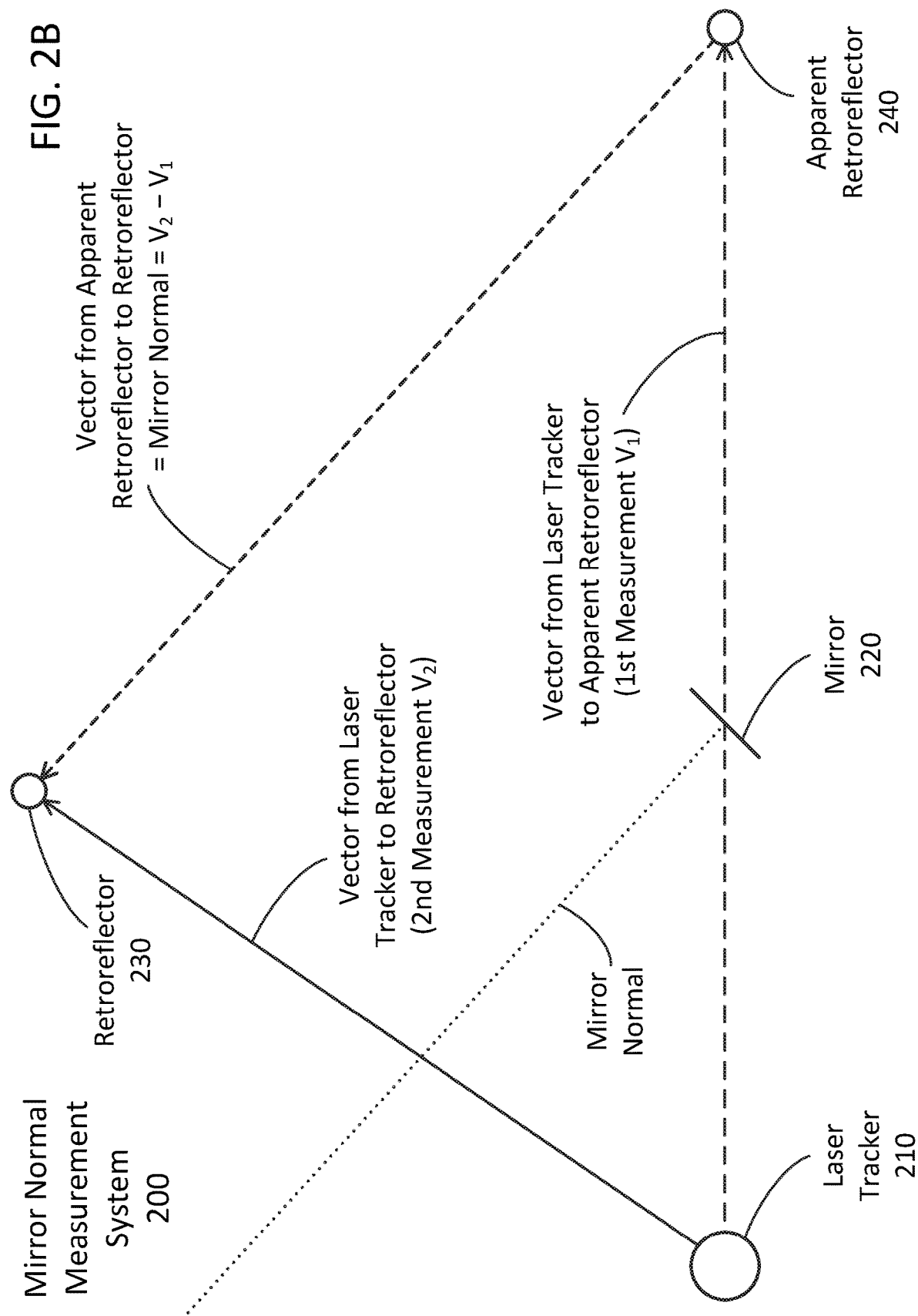

FIGS. 2A-2B are schematic diagrams of an example measurement system 200 for measuring a mirror normal, such as for calibrating a rotating mirror system like the rotating mirror system 100 of FIG. 1, according to an embodiment of the present disclosure. The measurement system 200 includes a laser tracker 210 and a retroreflector 230 (such as an SMR) to make two separate vector measurements. Mirror 220 is the mirror whose normal is being measured by the measurement system 200. The first measurement is illustrated in FIG. 2A and is an indirect measurement of the retroreflector 230 off the mirror 220. To the laser tracker 210, it is the same measurement as measuring the apparent retroreflector 240. The result of the measurement is a vector $V_1$ whose direction is towards the apparent retroreflector 240 and whose length is the distance to the apparent retroreflector 240, which is the same as the sum of the distance from the laser tracker 210 to the mirror 220 and the distance from the mirror 220 to the retroreflector 230.

The second measurement is illustrated in FIG. 2B and is a direct measurement of the retroreflector 230 from the laser tracker 210. The result of this measurement is a vector $V_2$ whose direction is towards the retroreflector 230 and whose length is the distance to the retroreflector 230. At this point, the mirror normal to the mirror 220 is the same as, and can be calculated from, the difference of the direct measurement $V_2$ to the retroreflector 230 and the indirect measurement $V_1$ to the retroreflector 230, or $V_2-V_1$. Accordingly, the mirror normal to the mirror 220 can be precisely measured by the laser tracker 210 by precisely measuring the vectors to the retroreflector 230 and to the apparent retroreflector 240.

FIG. 3 is a block diagram of an example computer system 300 for calibrating a rotating mirror system, such as the rotating mirror system 100 of FIG. 1, according to an embodiment of the present disclosure. The computer system 300 includes a microprocessor 310 for processing computer instructions and data, memory 320 for storing instructions being executed by and data being manipulated by the microprocessor 310, nonvolatile storage device 330 (such as a disk drive) for storing instructions and data over an extended period and when power is not being supplied to the computer system 300, and input/output 340 to represent various input and output devices and networks through which the computer system 300 interfaces with external entities.

While in some embodiments, the techniques described herein are carried out, for example, by the computer system 300 of FIG. 3, that may be in close proximity to the sensing platforms such as the laser tracker or trackers generating inputs including laser measurements 350 of (mirror) normals and vectors 350, the present disclosure is not limited to such environments. In other embodiments, the computer system 300 is physically (and possibly even geographically) separated from the sensing or measurement platforms. In some embodiments, the laser measurements 350 are processed in close temporal and/or physical proximity to their sensing. In some embodiments, the laser measurements 350 are processed sequentially in time order of their collection. In some embodiments, the laser measurements 350 are received in time order. In some embodiments, the laser measurements 350 are processed temporally and/or physically separated from their sensing. In some embodiments, there is only one laser tracker, the laser measurements 350 representing measurements entirely from that source. In some other embodiments, there are multiple laser trackers, synchronized to the same coordinate system, each generating a subset of the input laser measurements 350.

The computer system 300 and other electronic components and techniques described herein can be implemented as (or on, or instead of, or in addition to) an electronic processing component, such as a signal processor, a field programmable gate array (FPGA), a microprocessor, or the like. For example, the computer system 300 and other components or methods can be implemented in hardware or software, or some combination of the two. For instance, the computer system 300 can be implemented as illustrated, using a microprocessor 310 with instructions encoded therein (or through memory 320) that, when executed, cause the microprocessor 310 to carry out the tasks of the computer system 300. In another embodiment, the computer system 300 may be implemented as a custom circuit such as a field programmable gate array (FPGA) configured to carry out these tasks. In a further example, there are one or more memory units 320 (such as nonvolatile memory units) that is or are coupled to the processing component (e.g., microprocessor 310), and possibly one or more nonvolatile storage devices 330.

For example, the computer system 300 and other circuits disclosed herein may be custom hardware circuits or general-purpose computer hardware configured (e.g., through software, firmware, customized logic, to name a few) to carry out the tasks assigned to the circuit. While circuits are illustrated as being made up of other circuits by function, in other embodiments, two or more circuits may be combined into a single circuit performing the functionality of the two or more circuits. In still other embodiments, a single circuit can be divided into two or more circuits, each performing separate functions performed by the single circuit. As will be further appreciated, a circuit as used herein is a physical structure capable of carrying out one or more functionalities as variously provided herein, whether the structure be hardware only such as purpose-built semiconductor (e.g., gate-level logic or application specific integrated circuit) or a printed circuit board populated with discrete components configured and arranged to carry out the various functionalities provided herein, or a processor-based system programmed with computer code or instructions that are executable by the processor-based system to carry out the various functionalities provided herein, or a combination of such hardware and software based architectures (e.g., printed circuit board with one or more embedded routines executable by one or more processors). Numerous such embodiments and configurations will be appreciated in light of this disclosure.

Referring to FIG. 3, input records, such as laser measurements 350 of mirror normals, vectors, installation locations, and the like are received by the computer system 300 through input/output 340 (e.g., over a wired or wireless network, or through a dedicated channel to the sensing device, or the like). Each laser measurement 350 can represent a vector, for example, from a laser tracker, including both a direction and a distance (relative to the laser tracker). In some embodiments, the laser measurements acquired by multiple sensing devices, such as multiple laser trackers, and converted to a common coordinate system. The microprocessor 310 processes the laser measurements 350 to calculate or otherwise determine various results, including axes of rotation, coordinate systems, and translation and rotation matrices 360 for converting from one coordinate system to another. Example techniques for performing this processing are described in further detail below.

FIG. 4 is a block diagram of an example processing circuit 400 for calibrating a rotating mirror system, such as the rotating mirror system 100 of FIG. 1, according to an embodiment of the present disclosure. The processing circuit 400 receives various input laser measurements, including mirror normal measurements 405, fiducial vector measurements 435, and fiducial normal measurement 455. Each of these input measurements can be a vector measurement as obtained by a laser tracker (such as the laser tracker 210). The processing circuit 400 generates (e.g., calculates or otherwise determines) a set of data and structures for calibrating the underlying mirror system, such as axes of rotation 415 and 445, coordinate systems 425 and 465, and translation and rotation matrices 475. To this end, the processing circuit 400 includes a mirror axis calculate circuit 410, a mirror coordinate create circuit 420, an azimuth axis calculate circuit 440, a base coordinate create circuit 460, a translation matrix calculate circuit 470, and a mirror axis place circuit 480.

In further detail, the mirror axis calculate circuit 410 calculates or otherwise determines a mirror axis of rotation 415 for a rotatable mirror (such as elevation mirror 140 and cross-elevation mirror 160) from a set of mirror normal measurements 405. In some embodiments, this calculated axis of rotation 415 is a vector relative to an orientation point for rotating the mirror. The mirror normal measurements 405 can be obtained, for example, using a laser tracker system and the technique illustrated in FIG. 2 to measure each mirror normal for the rotatable mirror whose axis of rotation 415 is being determined. In some embodiments, numerous (such as 5, 10, 20, or 40) such mirror normals are measured, each at a different angle of rotation of the axis of rotation being calculated. In some such embodiments, the angles of rotation whose normals are being measured are evenly spaced, such as every 2.4° for the elevation mirror 140 and every 0.4° for the cross-elevation mirror 160. For instance, optical encoders can be used in the controllers of the elevation mirror 140 and cross-elevation mirror 160 to precisely control the rotation of these mirrors about their corresponding axes of rotation. In some embodiments, only subsets or sub-ranges of the ranges of possible elevation and cross-elevation angles of rotation are measured.

In some embodiments, the mirror axis calculate circuit 410 uses a least squares fit to the measured mirror normals to calculate the mirror axis of rotation 415. For instance, an approximate mirror axis of rotation can be estimated using some or all of the mirror normal measurements 405, and the estimate refined to minimize the sum of the squared differences between the observed measurements and the predicted measurements based on the estimated mirror axis of rotation 415. In this fashion, the mirror axis of rotation 415 can be determined as well as a closest linear relationship between expressed angle of rotation (e.g., on a mirror controller for the rotatable mirror) and actual angle of rotation (e.g., as measured or derived from measurements). In other words, from the sample mirror normals that are measured, the mirror normal at any angle of rotation of the mirror can be determined.

The mirror coordinate create circuit 420 creates a mirror coordinate system 425 based on the calculated mirror axis of rotation 415 and the mirror normal measurements 405. Here, the mirror axis of rotation 415 serves as a fixed reference line with respect to the rotatable mirror and that is not parallel to the measured normals 405. In different embodiments, different mirror normals may be used as one or more reference lines for the coordinate system, such as one or more actual mirror normal measurements 405, representative mirror normals, derived mirror normals (e.g., from the mirror normal measurements 405) and the like. In one such embodiment, the calculated axis of rotation 415 is used with the actual or derived mirror normal most orthogonal to the axis of rotation 415 for the two reference lines. A third reference line can then be derived from the cross product of these two reference lines to complete the mirror coordinate system 425. The mirror coordinate system 425 can also be determined from the mirror axis of rotation 415 and the derived linear relationship between the measured angle of rotation for the mirror and the angle of rotation as controlled by the rotatable mirror motor (e.g., elevation mirror motor 150 or cross-elevation mirror motor 170). The mirror coordinate system 425 provides a translatable and rotatable framework by which the rotatable mirror steers an incoming light beam and that can be expressed in terms of the axis of rotation 415 of the mirror (such as a vector and the location of a point of origination of the vector), and that is independent of the remaining components of the mirror system.

The azimuth axis calculate circuit 440 calculates or otherwise determines the azimuth axis of rotation 445 for the rotating mirror system from a set of fiducial vector measurements 435. In some embodiments, this calculated azimuth axis of rotation 445 is a vector relative to an orientation point for rotating the system board, such as the center of the top surface of a circular system board 110. The fiducial vector measurements 435 can be obtained, for example, using a laser tracker system having an SMR at a fixed location on the system board and that rotates correspondingly to the mirror system rotating about the azimuth axis of rotation 445. Vector measurements from the laser tracker to the SMR at numerous azimuth angles of rotation (e.g., at least three measurements, such as 6, 9, 18, or 36, or every 60°, every 40°, every 20°, or every 10° of azimuth rotation) measure the SMR at different corresponding locations that define an azimuth plane of rotation. For instance, an optical encoder can be used in the system board (azimuth) controller to precisely control the rotation of the system board about the azimuth axis of rotation.

In some embodiments, the azimuth axis calculate circuit 440 uses a least squares fit to the measured fiducial vectors 435 to calculate the azimuth axis of rotation 445. For instance, an approximate azimuth axis of rotation can be estimated using some or all of the measured fiducial vectors 435, and the estimate refined to minimize the sum of the squared differences between the observed measurements and the predicted measurements based on the estimated azimuth axis of rotation. In this fashion, the azimuth axis of rotation 445 can be determined as well as a closest linear relationship between expressed angle of rotation (e.g., on a mirror controller for the rotatable system board) and actual angle of rotation (e.g., as measured or derived from measurements).

The base coordinate create circuit 460 creates a base coordinate system 465 based on the calculated azimuth axis of rotation 445 and a fiducial normal measurement 455. For instance, the fiducial normal measurement 455 can be made using a laser tracker system measuring the normal of a side of an alignment cube, such as with the technique of FIG. 2. In some embodiments, the two lines (the calculated azimuth axis of rotation 445 and the fiducial normal measurement 455) serve as two orthogonal reference lines used to create the base coordinate system 465, a third reference line of which can be derived from the cross product of the other two. In some other embodiments, two orthogonal fiducial normal measurements 455 are obtained instead and used as the two orthogonal reference lines for creating the base coordinate system 465. The base coordinate system 465 provides a common coordinate system within which all of the other beam steering framework is mapped. The coordinate system can be any type, such as Cartesian, spherical, cylindrical, and the like.

The translation matrix calculate circuit 470 calculates or otherwise determines a translation and rotation matrix 475 for each of the rotatable mirrors (such as elevation mirror 140 and cross-elevation mirror 160) from the mirror coordinate system 425 to the base coordinate system 465. Accordingly, each of the rotatable mirrors can be separately calibrated and their coordinate systems 425 separately created. In one example embodiment, mirror fiducials (such as elevation mirror fiducial 155 and cross-elevation mirror fiducial 175) are used in conjunction with the mirror's axis of rotation 415 vector to permit translation and rotation of the mirror with a corresponding translation and rotation of the mirror's coordinate system 425.

The mirror axis place circuit 480 calculates or otherwise determines, for each of the rotatable mirrors (such as elevation mirror 140 and cross-elevation mirror 160), the location of the mirror axis of rotation 415, to place the calculated axis of rotation 415 into the base coordinate system 465 using the calculated translation and rotation matrix 475. Once placed into the base coordinate system 465, the mirror axes of rotation and their corresponding and mirror normal exemplars (as determined by the mirror coordinate systems 425 and converted to the base coordinate system 465 using the translation and rotation matrices 475) can be used to implement significantly improved laser beam steering with the rotatable mirror system (e.g., in some cases, with accuracy less than one arcsecond).

Methodology

Figure 5A:
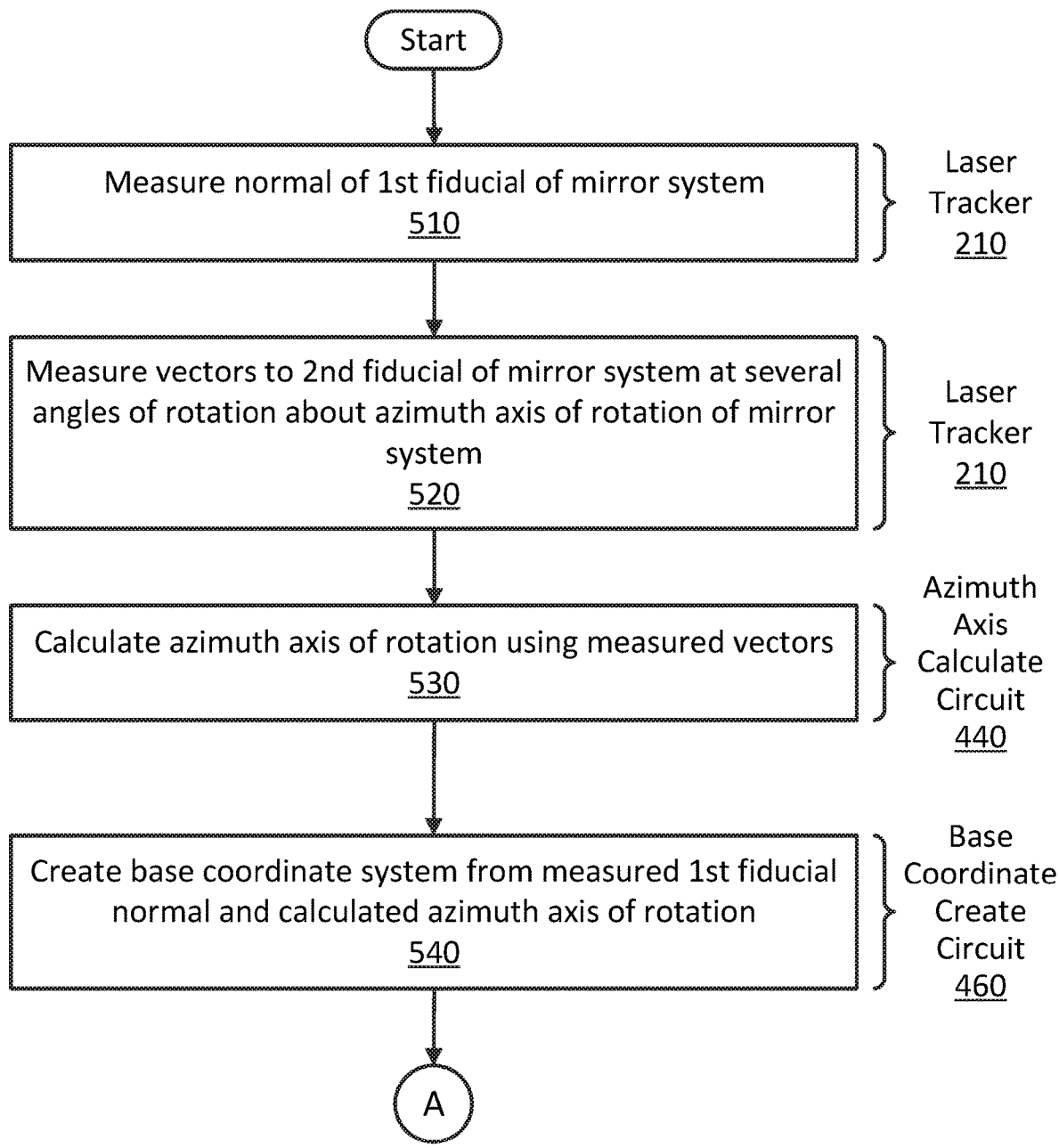
FIGS. 5A-5B are flow diagrams of an example method of calibrating a rotating mirror system, such as with the processing circuit of FIG. 4, according to an embodiment of the present disclosure.
Figure 5B:
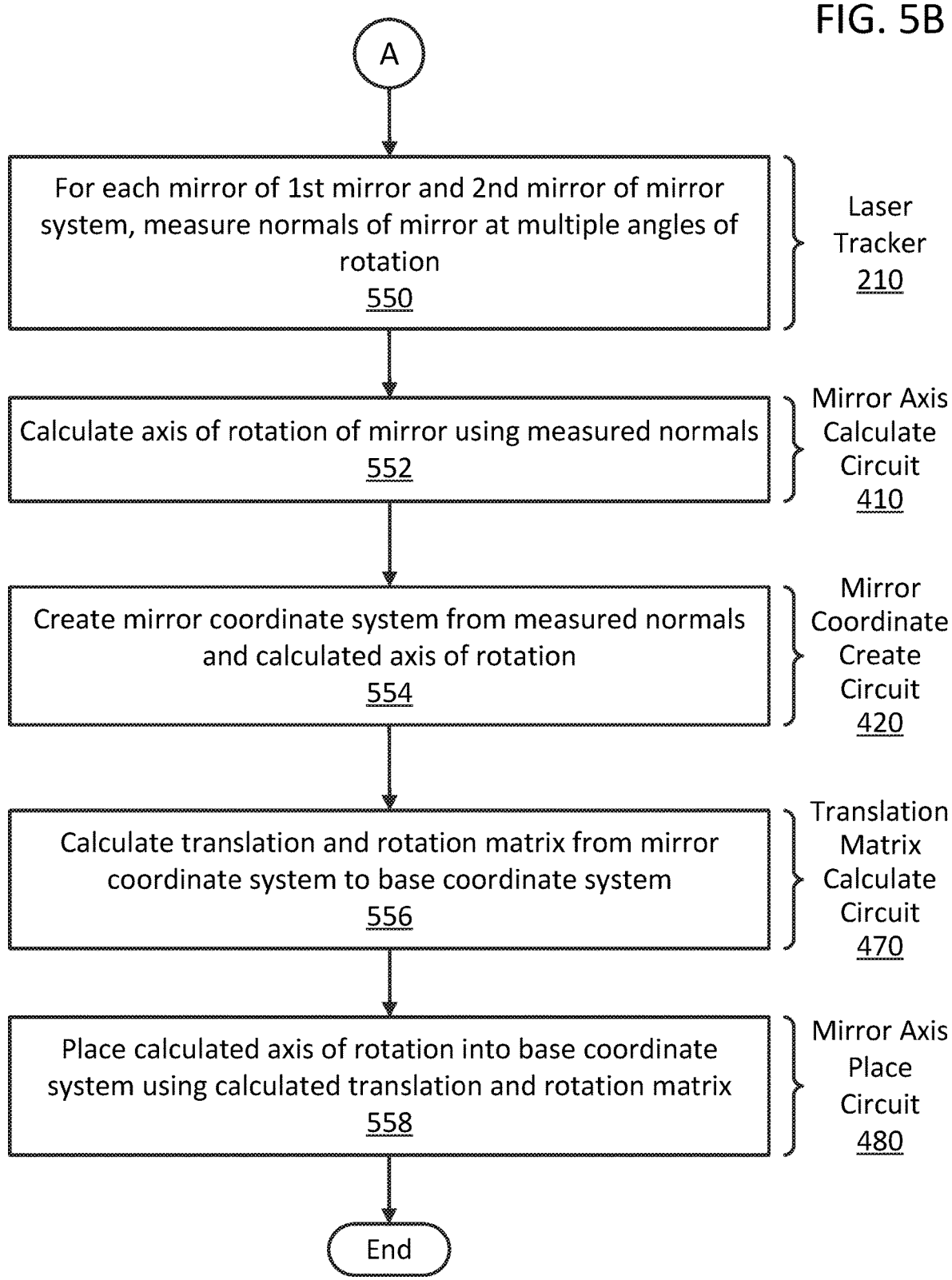

FIGS. 5A-5B are flow diagrams of an example method of calibrating a rotating mirror system, such as with the processing circuit 400 of FIG. 4, according to an embodiment of the present disclosure. The method 500 may be performed, for example, by the computer system 300 of FIG. 3 and the processing circuit 400 of FIG. 4. More generally, the method 500 and other methods described herein may be implemented in hardware or combinations of hardware and software. For example, the method 500 may be implemented using the components or techniques of FIGS. 1-4. In another embodiment, the method 500 may be implemented by or in conjunction with a custom circuit such as an FPGA configured to carry out all or most of method 500. In other embodiments, the method 500 may be performed in conjunction with a special purpose processor, such as a signal processor.

In some other embodiments, some or all of the method 500 may be implemented as a series of computer instructions, such as software, firmware, or a combination of the two, together with one or more computer processors (e.g., one or more microprocessors). The instructions, when executed on a given processor, cause portions of the method 500 to be performed. For example, in one or more embodiments, a computer program product is provided. The computer program product includes one or more non-transitory machine-readable mediums (such as a compact disc, a DVD, a solid-state drive, a hard drive, RAM, ROM, on-chip processor cache, or the like) encoded with instructions that when executed by one or more processors cause portions of the method 500 (or other method described herein) to be carried out for calibrating a rotating mirror system. In addition, while the methods described herein may appear to have a certain order to their operations, other embodiments may not be so limited. Accordingly, the order of the operations can be varied between embodiments, as would be apparent in light of this disclosure.

In method 500, processing begins in FIG. 5A with measuring 510, with a laser tracker (such as laser tracker 210), a normal of a first fiducial (such as first fiducial 120, like an alignment cube) of a rotating mirror system (such as rotating mirror system 100). The method 500 further includes measuring 520, with the laser tracker, vectors to a second fiducial (such as second fiducial 125, like an SMR) of the mirror system at several angles of rotation about an azimuth axis of rotation (such as azimuth axis of rotation 115) of the mirror system. The method 500 further includes calculating 530, with a processing circuit (such as azimuth axis calculate circuit 440), the azimuth axis of rotation (such as azimuth axis of rotation 445) using the measured vectors (such as fiducial vector measurements 435). The method 500 further includes creating 540, with the processing circuit (such as base coordinate create circuit 460), a base coordinate system (such as base coordinate system 465) from the measured first fiducial normal (such as fiducial normal measurement 455) and the calculated azimuth axis of rotation.

Continuing with FIG. 5B, the method 500 further includes processing for each of at least two rotating mirrors of the mirror system, including a first mirror (such as elevation mirror 140) and a second mirror (such as cross-elevation mirror 160). For each such rotating mirror, the method 500 includes measuring 550, with the laser tracker, normals of the mirror at multiple angles of rotation, and calculating 552, with the processing circuit (such as mirror axis calculate circuit 410), an axis of rotation (such as elevation axis of rotation 145 and cross-elevation axis of rotation 165) of the mirror using the measured normals (such as mirror normal measurements 405). The method 500 further includes creating 554, with the processing circuit (such as mirror coordinate create circuit 420), a mirror coordinate system (such as mirror coordinate system 425) from the measured normals and the calculated axis of rotation (such as mirror axis of rotation 415) of the mirror. The method 500 further includes calculating 556, with the processing circuit (such as translation matrix calculate circuit 470, a translation and rotation matrix (such as translation and rotation matrix 475) from the mirror coordinate system to the base coordinate system, and placing 558, with the processing circuit (such as mirror axis place circuit 480), the calculated axis of rotation into the base coordinate system using the calculated translation and rotation matrix.

Figure 6B:
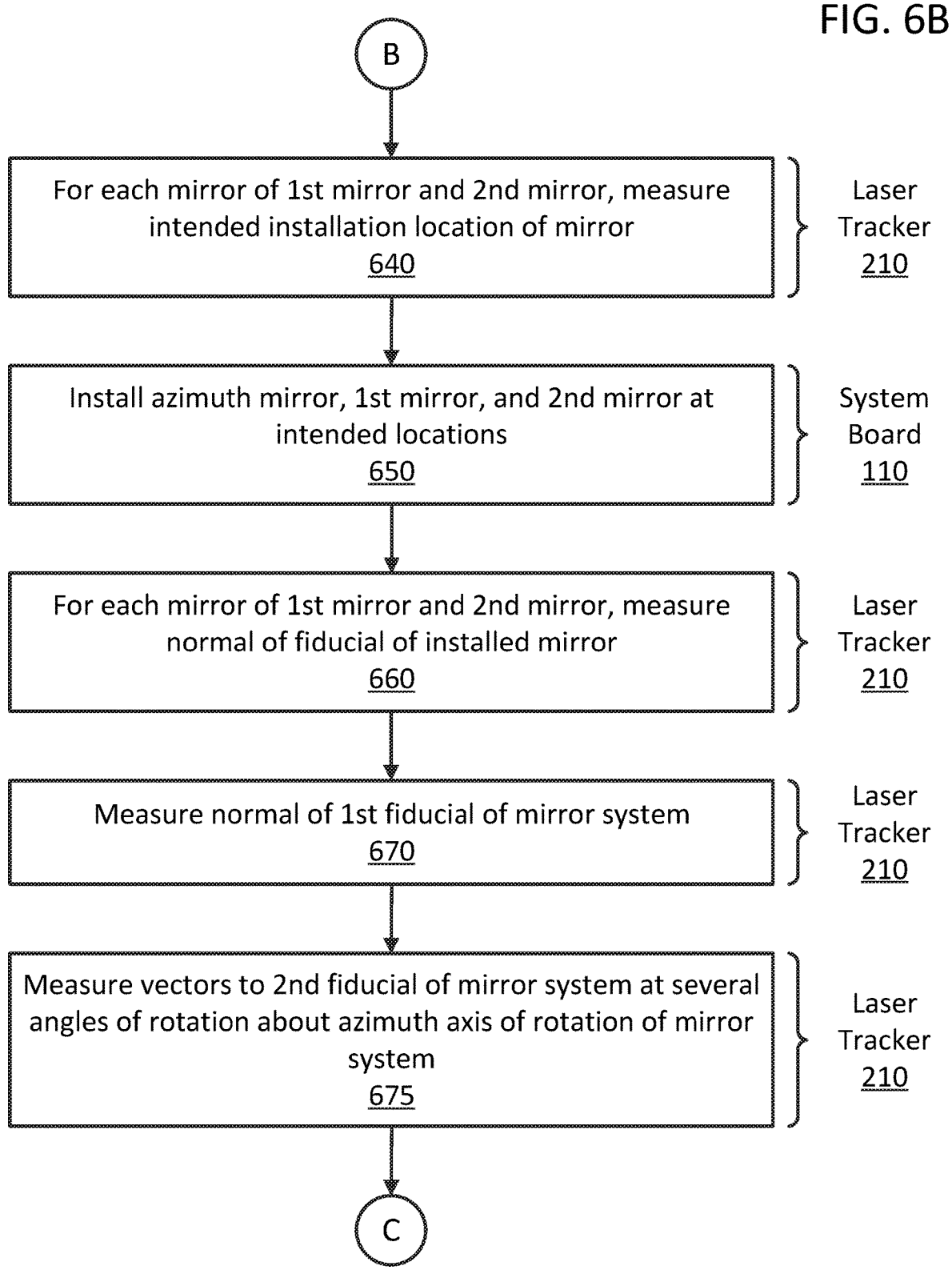
Figure 6C:
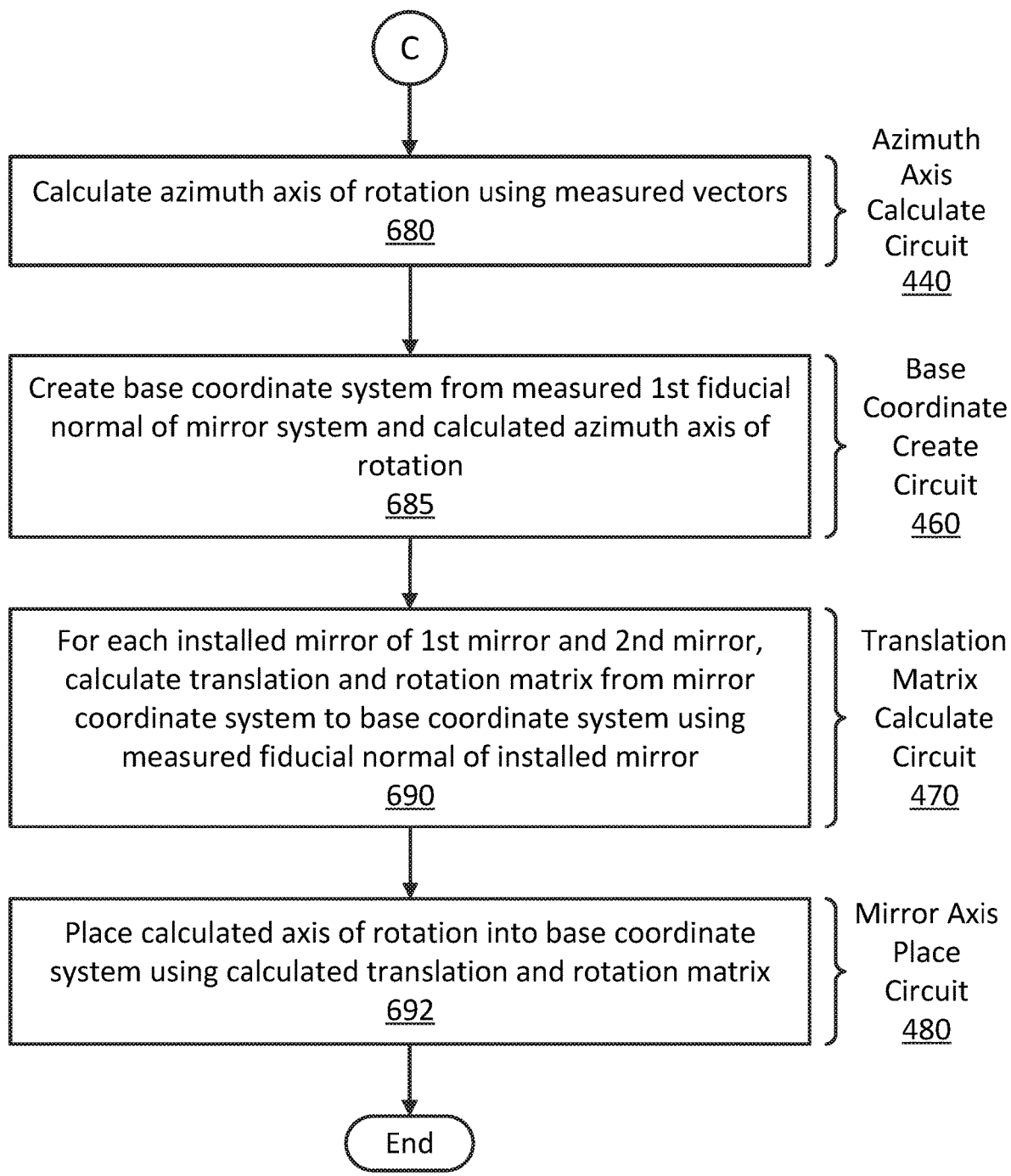

FIGS. 6A-6C are flow diagrams of an example method 600 of calibrating a rotating mirror system, such as with the processing circuit of FIG. 4, according to another embodiment of the present disclosure. In method 600, processing begins in FIG. 6A with measuring 610, with a laser tracker, a normal of a fiducial of an uninstalled azimuth mirror (such as azimuth mirror 130) of a rotating mirror system, and measuring 620, with the laser tracker, a normal of the uninstalled azimuth mirror. The method 600 further includes processing for each of at least two uninstalled rotating mirrors of the rotating mirror system. including a first mirror and a second mirror. For each such uninstalled rotating mirror, the method 600 includes measuring 630, with the laser tracker, a normal of a fiducial of the mirror (such as elevation mirror fiducial 155 and cross-elevation mirror fiducial 175). The method 600 further includes measuring 632, normals of the mirror at multiple angles of rotation, calculating 634, with a processing circuit, an axis of rotation of the mirror using the measured normals, and creating 636, with the processing circuit, a mirror coordinate system from the measured normals and the measured fiducial normal of the mirror.

Continuing with FIG. 6B, the method 600 further includes for each uninstalled rotating mirror, measuring 640, with the laser tracker, the intended installation locations (on a system board, such as system board 110) of the mirror. The method 600 further includes for each uninstalled mirror, installing 650 the mirror at its intended location on the system board. The method 600 further includes for each installed rotating mirror, measuring 660, with the laser tracker, the normal of the fiducial of the installed mirror. The method 600 further includes measuring 670, with the laser tracker, a normal of a first fiducial of the mirror system, and measuring 675, with the laser tracker, vectors to a second fiducial of the mirror system at several angles of rotation about an azimuth axis of rotation of the mirror system.

Continuing with FIG. 6C, the method 600 further includes calculating 680, with the processing circuit, the azimuth axis of rotation using the measured vectors, and creating 685, with the processing circuit, a base coordinate system from the measured first fiducial normal and the calculated azimuth axis of rotation. The method 600 further includes processing for each of the installed rotating mirrors. The processing includes calculating 690, with the processing circuit, a translation and rotation matrix from the mirror coordinate system to the base coordinate system using the measured fiducial normal of the installed mirror, and placing 692, with the processing circuit, the calculated axis of rotation into the base coordinate system using the calculated translation and rotation matrix. Numerous other methods and techniques will be apparent in light of the present disclosure.

Further Example Embodiments

The following examples pertain to further embodiments, from which numerous permutations and configurations will be apparent.

Example 1 is a method of calibrating a rotating mirror system, including: measuring, with a laser tracker, a normal of a first fiducial of the mirror system; measuring, with the laser tracker, vectors to a second fiducial of the mirror system at several angles of rotation about an azimuth axis of rotation of the mirror system; calculating, with a processing circuit, the azimuth axis of rotation using the measured vectors; creating, with the processing circuit, a base coordinate system from the measured first fiducial normal and the calculated azimuth axis of rotation; and for each mirror of a first mirror and a second mirror of the mirror system, measuring, with the laser tracker, normals of the mirror at multiple angles of rotation, calculating, with the processing circuit, an axis of rotation of the mirror using the measured normals, and creating, with the processing circuit, a mirror coordinate system from the measured normals and a reference line not parallel to the measured normals.

Example 2 includes the method of Example 1, further including for each mirror of the first mirror and the second mirror: calculating, with the processing circuit, a translation and rotation matrix from the mirror coordinate system to the base coordinate system; and placing, with the processing circuit, the calculated axis of rotation into the base coordinate system using the calculated translation and rotation matrix.

Example 3 includes the method of Example 1, wherein for each mirror of the first mirror and the second mirror, the reference line is the calculated axis of rotation of the mirror.

Example 4 includes the method of Example 1, further including for each mirror of the first mirror and the second mirror, measuring, with the laser tracker, a normal of a fiducial of the mirror, wherein the reference line is the measured fiducial normal of the mirror.

Example 5 includes the method of Example 1, wherein: for each mirror of the first mirror and the second mirror, calculating the axis of rotation includes calculating a least squares fit of the measured normals; and calculating the azimuth axis of rotation includes calculating a least squares fit of the measured vectors.

Example 6 includes the method of Example 1, wherein: the axis of rotation of the first mirror is normal to the azimuth axis of rotation; the axis of rotation of the second mirror is normal to the azimuth axis of rotation; and the axis of rotation of the second mirror is neither normal nor parallel to the axis of rotation of the first mirror.

Example 7 includes the method of Example 1, wherein the azimuth axis of rotation, the axis of rotation of the first mirror, and the axis of rotation of the second mirror are sufficient to steer a beam directed at the first mirror in any direction with an accuracy of one arcsecond or smaller.

Example 8 includes the method of Example 1, wherein the first fiducial is an alignment cube, and the second fiducial is a retroreflector.

Example 9 is a calibration system for a rotating mirror system, the calibration system including: a laser tracker to measure a normal of a first fiducial of the mirror system, measure vectors to a second fiducial of the mirror system at several angles of rotation about an azimuth axis of rotation of the mirror system, and for each mirror of a first mirror and a second mirror of the mirror system, measure normals of the mirror at multiple angles of rotation; an azimuth axis calculate circuit to calculate the azimuth axis of rotation using the measured vectors; a base coordinate create circuit to create a base coordinate system from the measured first fiducial normal and the calculated azimuth axis of rotation; a mirror axis calculate circuit to, for each mirror of the first mirror and the second mirror, calculate an axis of rotation of the mirror using the measured normals; and a mirror coordinate create circuit to, for each mirror of the first mirror and the second mirror, create a mirror coordinate system from the measured normals and a reference line not parallel to the measured normals.

Example 10 includes the calibration system of Example 9, further including: a translation matrix calculate circuit to, for each mirror of the first mirror and the second mirror, calculate a translation and rotation matrix from the mirror coordinate system to the base coordinate system; and mirror axis place circuit to, for each mirror of the first mirror and the second mirror, place the calculated axis of rotation into the base coordinate system using the calculated translation and rotation matrix.

Example 11 includes the calibration system of Example 9, wherein for each mirror of the first mirror and the second mirror, the reference line is the calculated axis of rotation of the mirror.

Example 12 includes the calibration system of Example 9, wherein: the laser tracker is further to, for each mirror of the first mirror and the second mirror, measure a normal of a fiducial of the mirror; and for each mirror of the first mirror and the second mirror, the reference line is the measured fiducial normal of the mirror.

Example 13 includes the calibration system of Example 9, wherein: the mirror axis calculate circuit is further to, for each mirror of the first mirror and the second mirror, calculate the axis of rotation by calculating a least squares fit of the measured normals; and the azimuth axis calculate circuit is further to calculate the azimuth axis of rotation by calculating a least squares fit of the measured vectors.

Example 14 includes the calibration system of Example 9, wherein: the axis of rotation of the first mirror is normal to the azimuth axis of rotation; the axis of rotation of the second mirror is normal to the azimuth axis of rotation; and the axis of rotation of the second mirror is neither normal nor parallel to the axis of rotation of the first mirror.

Example 15 includes the calibration system of Example 9, wherein the azimuth axis of rotation, the axis of rotation of the first mirror, and the axis of rotation of the second mirror are sufficient to steer a beam directed at the first mirror in any direction with an accuracy of one arcsecond or smaller.

Example 16 includes the calibration system of Example 9, wherein the first fiducial is an alignment cube, and the second fiducial is a retroreflector.

Example 17 is a computer program product including one or more non-transitory machine-readable storage mediums having instructions encoded thereon that when executed by one or more processors, cause a process to be carried out for calibrating a rotating mirror system, the process including: receiving a measurement of a normal of a first fiducial of the mirror system as measured by a laser tracker; receiving measurements of vectors to a second fiducial of the mirror system at several angles of rotation about an azimuth axis of rotation of the mirror system as measured by the laser tracker; calculating the azimuth axis of rotation using the measured vectors; creating a base coordinate system from the measured first fiducial normal and the calculated azimuth axis of rotation; and for each mirror of a first mirror and a second mirror of the mirror system, receiving measurements of normals of the mirror at multiple angles of rotation as measured by the laser tracker, calculating an axis of rotation of the mirror using the measured normals, and creating a mirror coordinate system from the measured normals and a reference line not parallel to the measured normals.

Example 18 includes the computer program product of Example 17, the process further including for each mirror of the first mirror and the second mirror: calculating a translation and rotation matrix from the mirror coordinate system to the base coordinate system; and placing the calculated axis of rotation into the base coordinate system using the calculated translation and rotation matrix.

Example 19 includes the computer program product of Example 17, wherein for each mirror of the first mirror and the second mirror, the reference line is the calculated axis of rotation of the mirror.

Example 20 includes the computer program product of Example 17, further including for each mirror of the first mirror and the second mirror, receiving a measurement of a normal of a fiducial of the mirror as measured by the laser tracker, wherein the reference line is the measured fiducial normal of the mirror.

Example 21 includes the computer program product of Example 17, wherein: for each mirror of the first mirror and the second mirror, calculating the axis of rotation includes calculating a least squares fit of the measured normals; and calculating the azimuth axis of rotation includes calculating a least squares fit of the measured vectors.

Example 22 includes the computer program product of Example 17, wherein: the axis of rotation of the first mirror is normal to the azimuth axis of rotation; the axis of rotation of the second mirror is normal to the azimuth axis of rotation; and the axis of rotation of the second mirror is neither normal nor parallel to the axis of rotation of the first mirror.

Example 23 includes the computer program product of Example 17, wherein the azimuth axis of rotation, the axis of rotation of the first mirror, and the axis of rotation of the second mirror are sufficient to steer a beam directed at the first mirror in any direction with an accuracy of one arcsecond or smaller.

Example 24 includes the computer program product of Example 17, wherein the first fiducial is an alignment cube, and the second fiducial is a retroreflector.

Example 25 is a mirror calibration system including: the computer program product of Example 17; the laser tracker; and the one or more processors to execute the encoded instructions.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. In addition, various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A method of calibrating a rotating mirror system, the method comprising:
   measuring a normal of a first fiducial of the mirror system;
   measuring vectors to a second fiducial of the mirror system, each vector being measured at a different angle of rotation about an azimuth axis of rotation of the mirror system;
   calculating the azimuth axis of rotation using the measured vectors;
   creating a base coordinate system from the measured first fiducial normal and the calculated azimuth axis of rotation; and
   for each of a first mirror and a second mirror of the mirror system,
      measuring normals of the mirror at multiple angles of rotation,
      calculating an axis of rotation of the mirror using the measured normals, and
      creating a mirror coordinate system from the measured normals and a reference line not parallel to the measured normals.

2. The method of claim 1, further comprising for each of the first mirror and the second mirror:
   calculating a translation and rotation matrix from the mirror coordinate system to the base coordinate system; and
   placing the calculated axis of rotation into the base coordinate system using the calculated translation and rotation matrix.

3. The method of claim 1, wherein for each of the first mirror and the second mirror, the reference line is the calculated axis of rotation of the mirror.

4. The method of claim 1, further comprising for each of the first mirror and the second mirror, measuring a normal of a fiducial of the mirror, wherein the reference line is the measured fiducial normal of the mirror.

5. The method of claim 1, wherein:
   for each of the first mirror and the second mirror, calculating the axis of rotation comprises calculating a least squares fit of the measured normals; and
   calculating the azimuth axis of rotation comprises calculating a least squares fit of the measured vectors.

6. The method of claim 1, wherein the azimuth axis of rotation, the axis of rotation of the first mirror, and the axis of rotation of the second mirror are sufficient to steer a beam directed at the first mirror in any direction with an accuracy of one arcsecond or smaller.

7. A calibration system for a rotating mirror system, the calibration system comprising:
   a laser tracker to
      measure a normal of a first fiducial of the mirror system,
      measure vectors to a second fiducial of the mirror system, each vector being measured at a different angle of rotation about an azimuth axis of rotation of the mirror system, and
      for each of a first mirror and a second mirror of the mirror system, measure normals of the mirror at multiple angles of rotation;
   an azimuth axis calculate circuit to calculate the azimuth axis of rotation using the measured vectors;
   a base coordinate create circuit to create a base coordinate system from the measured first fiducial normal and the calculated azimuth axis of rotation;
   a mirror axis calculate circuit to, for each of the first mirror and the second mirror, calculate an axis of rotation of the mirror using the measured normals; and
   a mirror coordinate create circuit to, for each of the first mirror and the second mirror,
      create a mirror coordinate system from the measured normals and a reference line not parallel to the measured normals.

8. The calibration system of claim 7, further comprising:
   a translation matrix calculate circuit to, for each of the first mirror and the second mirror, calculate a translation and rotation matrix from the mirror coordinate system to the base coordinate system; and
   mirror axis place circuit to, for each of the first mirror and the second mirror, place the calculated axis of rotation into the base coordinate system using the calculated translation and rotation matrix.

9. The calibration system of claim 7, wherein for each of the first mirror and the second mirror, the reference line is the calculated axis of rotation of the mirror.

10. The calibration system of claim 7, wherein:
    the laser tracker is further to, for each of the first mirror and the second mirror, measure a normal of a fiducial of the mirror; and
    for each of the first mirror and the second mirror, the reference line is the measured fiducial normal of the mirror.

11. The calibration system of claim 7, wherein:
    the mirror axis calculate circuit is further to, for each of the first mirror and the second mirror, calculate the axis of rotation by calculating a least squares fit of the measured normals; and
    the azimuth axis calculate circuit is further to calculate the azimuth axis of rotation by calculating a least squares fit of the measured vectors.

12. The calibration system of claim 7, wherein the azimuth axis of rotation, the axis of rotation of the first mirror, and the axis of rotation of the second mirror are sufficient to steer a beam directed at the first mirror in any direction with an accuracy of one arcsecond or smaller.

13. A computer program product including one or more non-transitory machine-readable storage mediums having instructions encoded thereon that when executed by one or more processors, cause a process to be carried out for calibrating a rotating mirror system, the process comprising:
    receiving a measurement of a normal of a first fiducial of the mirror system;
    receiving measurements of vectors to a second fiducial of the mirror system, each vector being measured at a different angle of rotation about an azimuth axis of rotation of the mirror system;
    calculating the azimuth axis of rotation using the measured vectors;
    creating a base coordinate system from the measured first fiducial normal and the calculated azimuth axis of rotation; and
    for each of a first mirror and a second mirror of the mirror system, receiving measurements of normals of the mirror at multiple angles of rotation, calculating an axis of rotation of the mirror using the measured normals, and creating a mirror coordinate system from the measured normals and a reference line not parallel to the measured normals.

14. The computer program product of claim 13, the process further comprising for each of the first mirror and the second mirror:

calculating a translation and rotation matrix from the mirror coordinate system to the base coordinate system; and placing the calculated axis of rotation into the base coordinate system using the calculated translation and rotation matrix.

15. The computer program product of claim 13, wherein for each of the first mirror and the second mirror, the reference line is the calculated axis of rotation of the mirror.

16. The computer program product of claim 13, further comprising for each of the first mirror and the second mirror, receiving a measurement of a normal of a fiducial of the mirror, wherein the reference line is the measured fiducial normal of the mirror.

17. The computer program product of claim 13, wherein:
for each of the first mirror and the second mirror, calculating the axis of rotation comprises calculating a least squares fit of the measured normals; and calculating the azimuth axis of rotation comprises calculating a least squares fit of the measured vectors.

18. The computer program product of claim 13, wherein:
the axis of rotation of the first mirror is normal to the azimuth axis of rotation;
the axis of rotation of the second mirror is normal to the azimuth axis of rotation; and
the axis of rotation of the second mirror is neither normal nor parallel to the axis of rotation of the first mirror.

19. The computer program product of claim 13, wherein the azimuth axis of rotation, the axis of rotation of the first mirror, and the axis of rotation of the second mirror are sufficient to steer a beam directed at the first mirror in any direction with an accuracy of one arcsecond or smaller.

20. The computer program product of claim 13, wherein the first fiducial is an alignment cube, and the second fiducial is a retroreflector.

* * * * *